United States Patent [19]
Fend et al.

[11] Patent Number: 5,797,387
[45] Date of Patent: Aug. 25, 1998

[54] ABSORBER

[75] Inventors: Thomas Fend, Cologne; Bernhardt Hoffschmidt, Bergisch Gladbach; Robert Pitz-Paal, Cologne; Peter Rietbrock, Haltern, all of Germany

[73] Assignee: Deutsche Forschungsanstalt fur Luft-und Raumfahrt e.V., Bonn, Germany

[21] Appl. No.: 708,237

[22] Filed: Sep. 6, 1996

[30] Foreign Application Priority Data

Sep. 27, 1995 [DE] Germany .................. 195 35 896.1

[51] Int. Cl.[6] .................................................. F24J 2/02
[52] U.S. Cl. ........................ 126/680; 126/674; 126/684
[58] Field of Search ............................. 126/680, 674, 126/684, 634, 675; 60/641.15

[56] References Cited

U.S. PATENT DOCUMENTS

| | | | |
|---|---|---|---|
| 4,047,517 | 9/1977 | Arnberg | 126/687 |
| 4,121,564 | 10/1978 | Schwartz | 126/684 |
| 4,263,895 | 4/1981 | Colao | 60/641.15 |
| 4,394,859 | 7/1983 | Drost | 126/684 |
| 4,683,872 | 8/1987 | Fricker | 126/674 |
| 4,873,061 | 10/1989 | O'Hare | 126/674 |
| 5,437,265 | 8/1995 | Yamauchi | 126/680 |

*Primary Examiner*—James C. Yeung
*Attorney, Agent, or Firm*—Akin, Gump, Strauss, Hauer & Feld, LLP

[57] ABSTRACT

The invention relates to an absorber designed to absorb radiation and to transfer the energy of the radiation to a heat transport medium. To provide an absorber with high efficiency, the absorber according to the invention comprises a plurality of absorber components (32) attached to each other and having passages (42) formed therein for absorption of radiation and for suctional intake of a heat transport medium. Each absorber component (32) is provided with a dedicated mixing chamber (44) having said passages (42) of said absorber component (32) entering thereinto and comprising flow-restricting outlet orifices for connection to a suction means.

9 Claims, 3 Drawing Sheets

1
ABSORBER

The present invention relates to an absorber for taking up radiation, particularly solar radiation, and for transferring the energy of the radiation to a heat transport medium. The energy transferred to said heat transport medium can then be transported by the heat transport medium to a power unit or to a plant operated by use of process heat.

BACKGROUND OF THE INVENTION

To make the energy contained in sunrays available for use, absorbers are utilized in combination with heliostat fields. Heliostats are mirrors designed for concentration of the sunrays at the site of an absorber. Under the effect of said concentration, the absorber is heated up to reach very high temperatures. The thus heated absorber will then heat the heat transport medium to a temperature high enough to allow a large-scale use of the heated heat transport medium.

For radiation take-up and for suctional intake of the heat transport medium, a plurality of capillary passages can be provided in an absorber. Radiation which is reflected e.g. from the heliostat field is radiated into the passages of the absorber and taken up by the walls of the passages of the absorber component. Subsequently, the heat transport medium, e.g. air, while sucked through the passages of the absorber component, will convectively take up the heat of the walls which have been heated by the radiation.

When subjected to the radiation impinging thereon, the absorber is heated in non-uniform manner. For instance, the temperatures may be higher in the center of the absorber than at its edges. Due to the high temperatures involved, the absorber is exposed to thermal stresses. Because of the restricted thermal resistance of the absorber, i.e. its limited ability to withstand high temperatures and changes of temperatures, the range of applications of the absorber is narrow and its efficiency is relatively unsatisfactory.

It is an object of the invention to provide an absorber operating with a high efficiency.

SUMMARY OF THE INVENTION

According to the present invention, the absorber comprises a plurality of absorber components attached to each other. Each of said absorber components is formed with a plurality of capillary passages from which the heat transport medium flows into a dedicated mixing chamber provided for the absorber component. Each individual mixing chamber is provided with one or a plurality of flow-restricting outlet orifices, serving for connection to a suction means. The total cross section of the outlet orifices determines the quantity of the heat transport medium flowing through the respective absorber component.

Since each absorber component comprises its own mixing chamber having flow-restricting outlet orifices for determining the flow of heat transport medium, the flow rate of the heat transport medium through the absorber can be predetermined with high accuracy. By arranging absorber components of different flow rates in a manner corresponding to the intensity distribution of the radiation, the flow of heat transport medium through the absorber is individually and precisely adapted to the intensity distribution of the radiation, with only a sole suction means being required for the absorber. Depending on the individual absorber components, regions subjected to a very high radiation will have the heat transport medium flowing therethrough at a high rate, while the heat transport medium is quickly heated and the respective absorber component is cooled to a sufficient extent. Those regions of the absorber where the intensity of the radiation is relatively small are provided with absorber components which have the heat transport medium sucked therethrough at a correspondingly lower rate. Thus, a sufficient length of time is available for the heat transport medium to be heated up to high temperatures. Since the absorber components heat up the heat transport medium independently from the intensity of the radiation, the combined flow of the heat transport medium, consisting of the partial flows of the individual absorber components, will have a very high temperature. Because of the mosaic-like structure of the absorber, comprising numerous different absorber components assembled to each other, also small differences in the intensity of the radiation can be considered. Thus, the absorber is adjustable not only concerning the overall flow passing through it, but also on the level of the absorber components forming the smallest exchangeable units of the absorber.

In case of an individual absorber component showing visible signs of to-be-expected destruction due to an insufficient medium flow therethrough, this absorber component can easily be exchanged by an absorber component of a higher flow rate, thereby precluding damage to the whole absorber. As already explained above, regions of the absorber which are heated very massively by particularly strong radiation, are cooled to a correspondingly large extent by a high flow rate, while the heat transport medium can take up a large amount of energy in the process.

In the edge regions of the absorber where the absorber is subjected to a lower radiation intensity, the flow rate is set to a correspondingly low level so that the heat transport medium can be brought to a high temperature independently from its way through the absorber. In the absorber according to the invention, this control of the heat transport medium flow passing through the absorber is performed, as it were, point by point and individually for the whole surface of the absorber, wherein each absorber component represents an independent point which can be set independently of the rest of the absorber. This feature allows for operation of the absorber at a very high temperature level without any risk to the operational safety due to overheating. The use of the absorber at the highest possible temperatures results in a high efficiency.

Since the absorber is assembled from individual absorber components, it can be changed and adapted to varying radiation conditions by exchanging individual absorber components. Further, maintenance and repair work on the absorber are facilitated because the whole absorber is of a modular structure comprising individual absorber components. Further, use can be made of a plurality of types of absorber components which are identical to each other. Preferably, the absorber components basically have a uniform structure. Particularly, the absorber components have identical outer dimensions and an identical configuration of the passages. The mixing chambers of all absorber components are arranged at one of only two different depth levels, and the flow through the absorber components can be easily preset by providing differently shaped outlet orifices. These provisions make it very convenient to compile a modular set of different absorber components from which a desired individual absorber can be assembled in a short time. Since the absorber components are separate components, also the outer geometry of the absorber is largely freely selectable.

A high efficiency can be reached if the temperature of the heat transport medium in its heated condition is very high. When using air for a heat transport medium, temperatures ranging from 700°–800° C. will yield a good efficiency.

Temperatures in that range, however, can be reached only by bundling the rays to generate temperatures of about 1600° C. at the front of the absorber. Unfavorably, such high temperatures tend to expose the absorber and its components to extreme thermal stresses. To render the absorber resistant to these stresses, the absorber components with the absorption member and the mixing chamber are integrally formed as a one-pieced ceramics body. On the one hand, a ceramic material would melt only at very high temperatures while, on the other hand, its thermal expansion is low. Since the individual absorber components are each made from one piece, their thermal expansion coefficient is uniform over their entire depth. Thus, the heating of the absorber component does not lead to sudden dimensional changes as is the case in multi-part components, so that the thermal stress resistance is increased. Because of the one-pieced structure of the absorber components, no connecting elements and adhesives will be required for connecting the individual functional units of the absorber component. Therefore, the absorber component can be subjected to very high temperatures without the danger that an increase or decrease of the absorber temperature might cause tensions high enough to destroy the absorber component.

In case of malfunction of the suction means, the absorber will suffer excessively high temperatures within a very short time, i.e. after a few seconds. If such high temperatures cause the absorber to melt or break, also system components arranged behind the absorber will melt and disintegrate as a matter of minutes before the radiation can be switched off or reduced. The above mentioned improved thermal resistance of the absorber reduces the risk of destruction in case of failure of the suction means.

In an absorber component provided as a one-pieced ceramics body, the mixing chamber preferably comprises channels which cross each other and extend transversely to the passages while intersecting them. The absorber component can be produced from a block having the passages extending therethrough and including the channels constituting the mixing chamber. In such an arrangement, the mixing chamber can be produced without jointing processes, and there are left no jointing surfaces which would form weak points.

Said channels reliably provide the interconnections between the passages of an absorber component without excessively weakening the structure of absorber component. Further, by the arrangement of the channels which are oriented in parallel and at mutual distances and, when viewed in projection, are super-imposed onto each other, it is safeguarded that all of the passages of an absorber component enter the mixing chamber. Thus, local overheating and destruction within an absorber component are prevented. Due to the mutually crossing channels, the mixing chamber has a vault-like structure wherein a plurality of supporting columns connect the channel portion with a rear surface of the absorber component.

If the passages of the absorber component are closed on one side by a ceramics material configured to form an end layer, uncontrolled leakage of the heat transport medium from an absorber component is prevented. Both a rear end layer and a plurality of lateral end layers can be provided. Said end layers make it possible to form the outlet orifices in a particularly simple manner by leaving free areas in an end layer.

Preferably, the mixing chambers of different absorbers are separated from each other by being arranged at a mutual displacement. In such a displaced arrangement of the mixing chambers, a lateral flow communication between adjacent absorber components is prevented in that a laterally open mixing chamber of an absorber component is located, with regard to the front side of the absorber component, at a different depth from that of the mixing chamber of an adjacent absorber component. In places where a mixing chamber borders on the absorption member of an adjacent absorber component, an overflow of the heat transport medium from the mixing chamber of the former absorber component into the latter absorber component is precluded either by the walls of the passages of the absorption members or by an end layer of ceramics material.

If the absorber components are designed to differ only in the overall cross section of their outlet orifice(s), an exchange of individual absorber components by other absorber components for obtaining a desired change of the flow rate of the absorber, can be performed in a particularly simple manner. Also the manufacturing of a plurality of different types of absorber components is facilitated.

A ceramic fiber material can be provided between the absorber components. Said fiber material does not only prevent a flow of heat transport medium from one absorber component to an adjacent absorber component but additionally seals the regions between the individual absorber components of the absorber towards the front and rear sides. Further, the ceramic fiber material compensates for thermal expansion of the absorber components.

If the absorber components are assembled without using a binding agent and are arranged in a vault-like configuration, the absorber is suited for extremely high temperatures. In such an arrangement, the concave side of the absorber is directed downwards so that the absorber comprises a self-supporting domed structure. Thus, thermal expansion of the individual absorber components will result in a bulging deformation of the absorber but will not cause increased pressing forces between the absorber components which would destroy the absorber.

Further advantageous embodiments and modifications of the invention will be evident from the subclaims and the following detailed description in conjunction with the accompanying drawings.

DETAILED DESCRIPTION OF PREFERRED EMBODIMENTS

Figure 1:
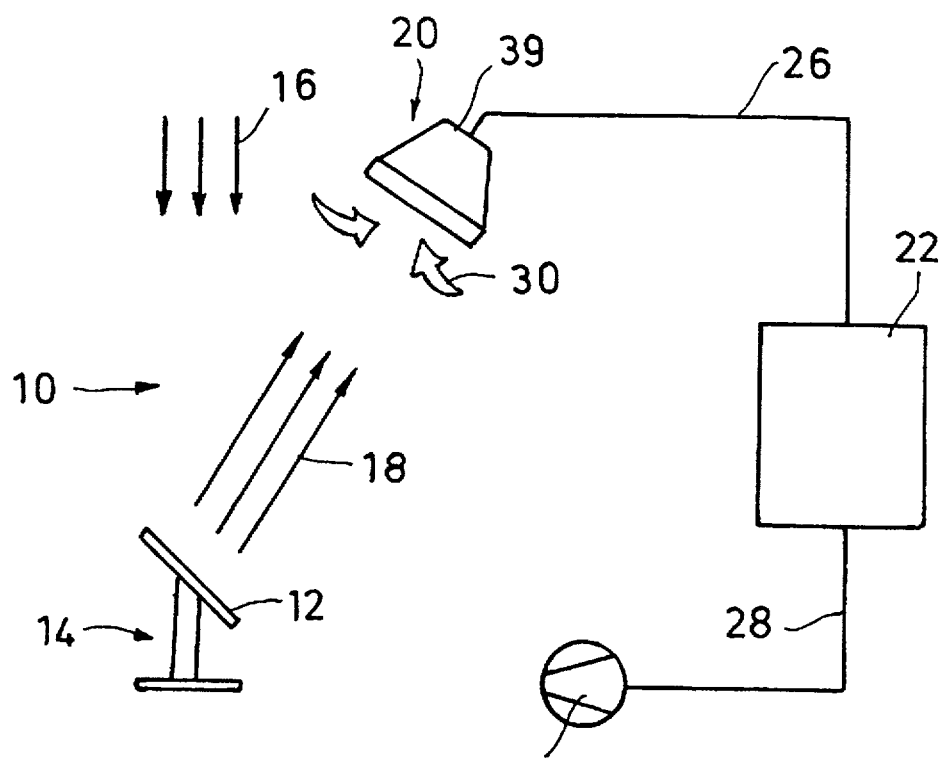
FIG. 1 is a schematic representation of a solar power plant provided with an absorber.

The solar power plant 10 shown in FIG. 1 comprises a heliostat field 14 including a plurality of adjustable mirrors 12 and designed to collect sunlight 16 and to reflect the collected sunlight in the form of bundled radiation 18 to an absorber 20. Absorber 20 cooperates with a power plant unit 22 and a suction means 24, forming a system with these. Absorber 20 is connected to power plant unit 22 via a suction line 26. Power plant unit 22 is connected to suction means 24 via a suction line 28.

In the solar power plant 10, air is used as the heat transport medium 30. Said air is infed into the system at the absorber 20 and is heated internally of the absorber. The heat transport medium 30 is transported through the system by the action of suction means 24, and the heat taken up by heat transport medium 30 within absorber 20 is released in the power plant unit 22. At a point downstream of suction means 24, the heat transport medium 30 is discharged from the system so that the system can be conceived of as a half-open system.

Figure 2:
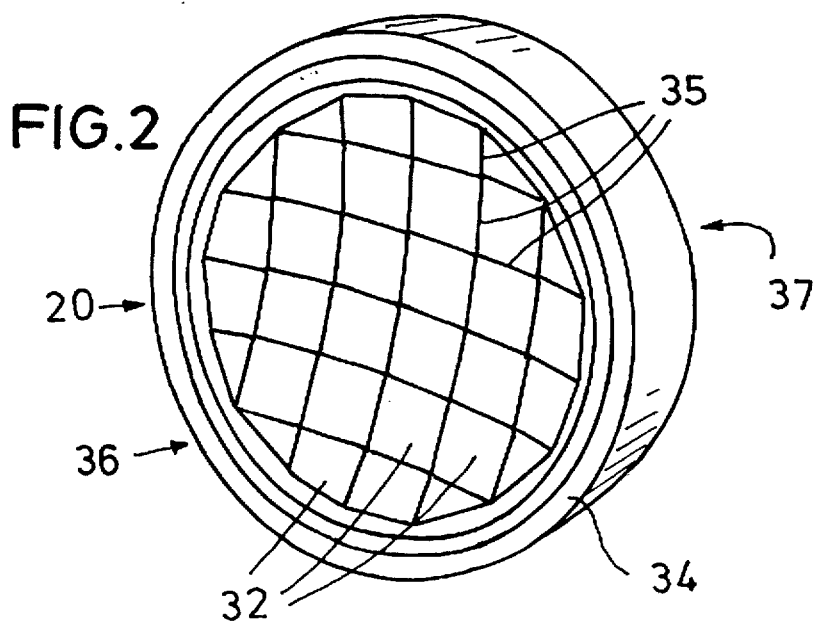
FIG. 2 is a perspective front view of an absorber for a solar power plant.

The configuration of absorber 20 is of central importance for the function of the solar power plant. Absorber 20, illustrated in perspective view in FIG. 2, operates after the principle of a volumetric receiver. Absorber 20 comprises a plurality of blockshaped absorber components 32, arranged next to each other in a mosaic-like configuration and together forming a flatly curved dome. The absorber components 32 are held by a support ring 34 circumferentially surrounding them. Arranged between the individual absorber components 32 are a plurality of layers of a ceramic fiber material 35, particularly of a ceramic non-woven material. Said fiber material 35 compensates for thermal expansions of the absorber components 32 and seals the absorber components 32 against each other.

The concave side of the flat dome formed by the absorber components 32 is arranged at the front 36 of absorber 20. During operation, this front 36 is exposed to the focussed radiation 18 and, since the absorber 20 is usually fastened to a support tower, is directed downwards. On the rear side 37 of absorber 20, a suction chamber 39 (FIG. 1) is arranged to cover all of the absorber components. Within suction chamber 39, a vacuum is generated by suction means 24. Under the effect of this vacuum, air is sucked in at the front 36 of absorber 20 and is drawn through the individual absorber components 32.

Figure 3:
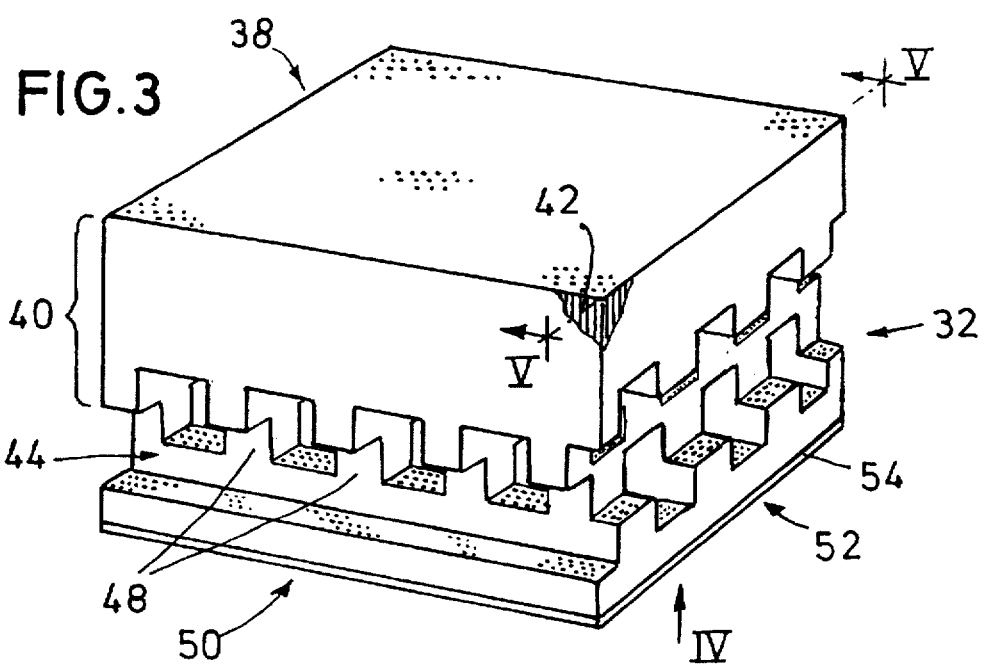
FIG. 3 is a perspective view of an absorber component according to a first embodiment of the invention.
Figure 4:
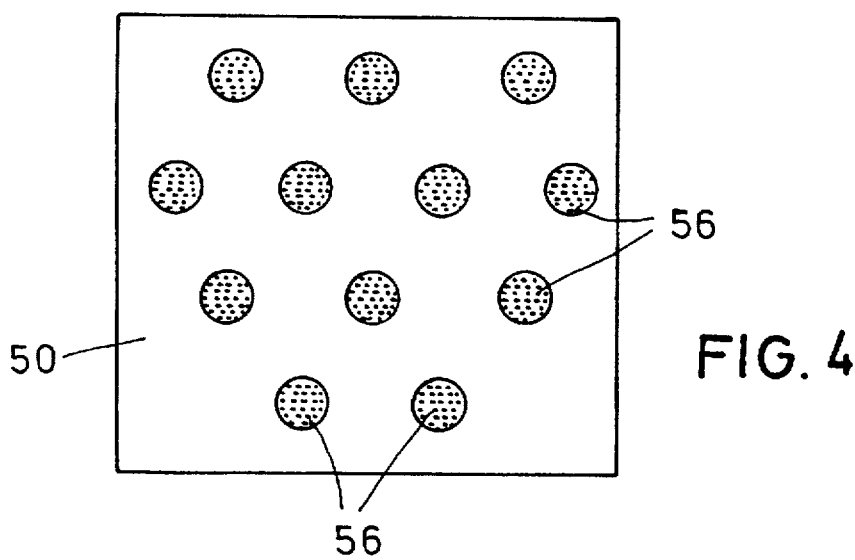
FIG. 4 is a view of the absorber of FIG. 3 as seen in the direction of arrow IV.
Figure 5:
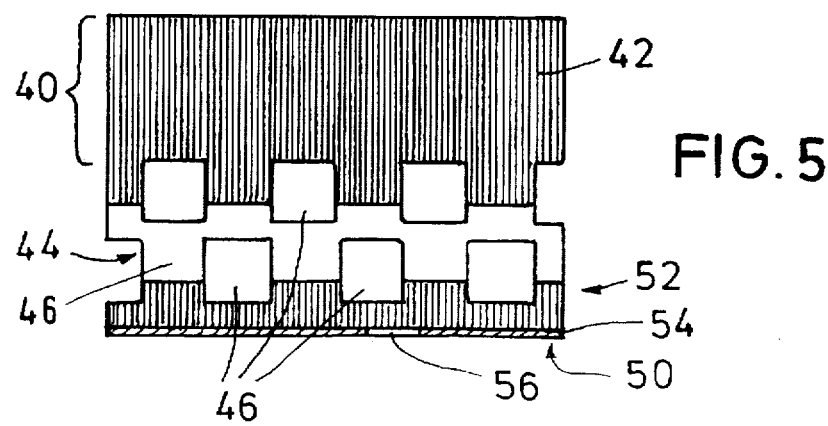
FIG. 5 is a sectional view of the absorber component of FIG. 3 along the line V—V in FIG. 3.

An individual absorber component 32 is illustrated in FIGS. 3 to 5. Absorber component 32 has a surface area of about 15 cm×15 cm and a thickness of about 10 cm. Absorber component 32 is formed as a one-pieced structure and is made from a highly temperature-resistant ceramic material. An absorption member 40 is arranged at the front 38 of absorber component 32. Absorption member 40 has a plurality of mutually parallel passages 42 formed therein. Said passages 42 are rectilinear and of a capillary shape in the manner of a foil receiver, and extend from the front 38 of absorber component 32 to a mixing chamber 44 arranged internally of absorber component 32. The passages 42 have a cross section of about 1.6 mm×1. 6 mm. When seen in a sectional view transversely to the passages 42, the relative surface area of the walls delimiting the passages is smaller than the area of the inside cross sections of the orifices. In place of an absorption member 40 with capillary passages 42, the absorption member can alternatively be provided to have open-cell passages in the manner of a foam receiver.

The mixing chamber 44 within absorber component 32 is formed by a plurality of mutually crossing channels 46 which are arranged at such a displacement relative to each other that the channels 46 intersect all passages 42 (FIG. 5). In the present embodiment, all of the channels 46 have a quadratic cross section, the lengths of their edges been identical to each other. Because of the displacement of the channels 46 relative to each other, only columnar supports 48 are left, connecting the absorption member 40 to a connecting wall 52 formed at the rear side 50 of absorber component 32. The channels 46, extending at right angles to each other, lend a vault-like structure to the mixing chamber 44. The passages 42 extend to a region beyond the mixing chamber 44, where the walls of the passages form the rear connecting wall 52.

The connecting wall 52 is rendered impermeable to gas by a ceramics layer 54 closing the continuous passages formed in the connecting wall 52. For connection of the mixing chamber 44 to a suction means 24, outlet orifices 56 are provided in said closing layer 54. Through these outlet orifices 56, the heat transport medium 30 is transported from the mixing chambers 44 of the absorber components 32 to the suction chamber 39 and from there, via power plant unit 22, to suction means 24. The number of the outlet orifices 56 and the total cross section of the outlet orifices 56 are determined on the basis of the flow quantity of heat transport medium 30 required for the respective absorber component 32. Using the throttle effect of the outlet orifices 56, the flow quantities of the individual absorber components 32 can be set independently from each other although a uniform vacuum prevails in suction chamber 39. The arrangement of the outlet orifice 56 can be selected largely in any desired manner because the vault-like structure of mixing chamber 44 provides for a uniform flow through all passages 42 of an absorber component 32 almost independently of the arrangement of outlet orifice 56. During the flow of the heat transport medium 30 through the respective absorber component 32, the columnar supports 48 act like auxiliary installations causing a turbulence of the heat transport medium 30 flowing through the absorber component 32 and thus effecting a uniform pressure level. Therefore, the columnar supports 48 prevent the formation of individual stream lines.

During operation, bundled radiation 18 impinging on the absorber component 32 enters the passages 42 and is absorbed by the walls of the passages 42. Thereby, the absorption member 40 of absorber component 32 is heated up. The resultant thermal energy accumulating in the absorber component 32 is taken up by the air flowing through the absorber component 32. Since the flow is uniform in all of the passages 42 of all absorber components 32, local overheating within the component are precluded.

The heat transport medium 30 heated in the above manner flows from absorption member 40 into mixing chamber 44 and from there into suction chamber 39, with the outlet orifices 56 controlling the flow through the individual absorber components 32. If, for instance, the radiation reflected from the heliostat field 14 causes a—per se undesired—intensity distribution in the manner of a Gaussian curve at the absorber 20, the central region of absorber 20 is heated to a higher extent than the edge regions of absorber 20. If the flow were uniform, not enough heat would be transferred from the center of absorber 20, resulting in overheating and thus destruction of absorber 20. Thus, the heat transport medium 30 has to eliminate more heat in the central region than at the edge. This effect is obtained by providing an increased flow through the individual absorber components 32 and, particularly, by causing this flow the pass through an increased total cross sectional area of the outlet orifices 56 of the respective absorber component 32.

Figure 6:
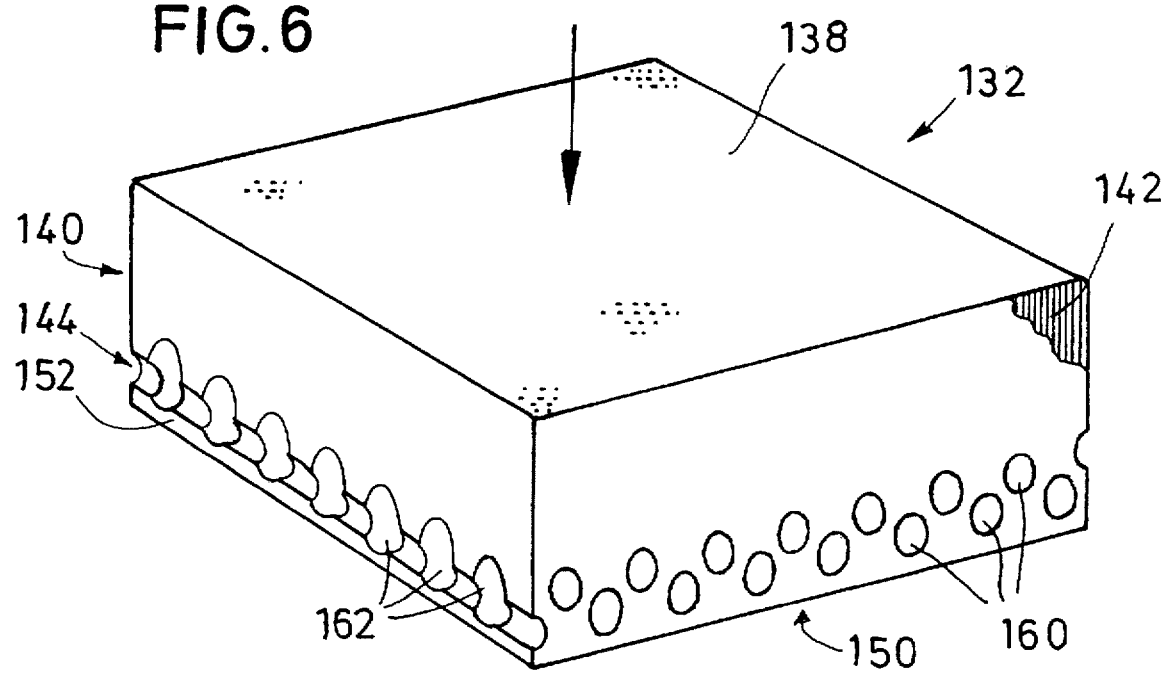
FIG. 6 is a perspective front view of an absorber component according to a second embodiment.
Figure 7:
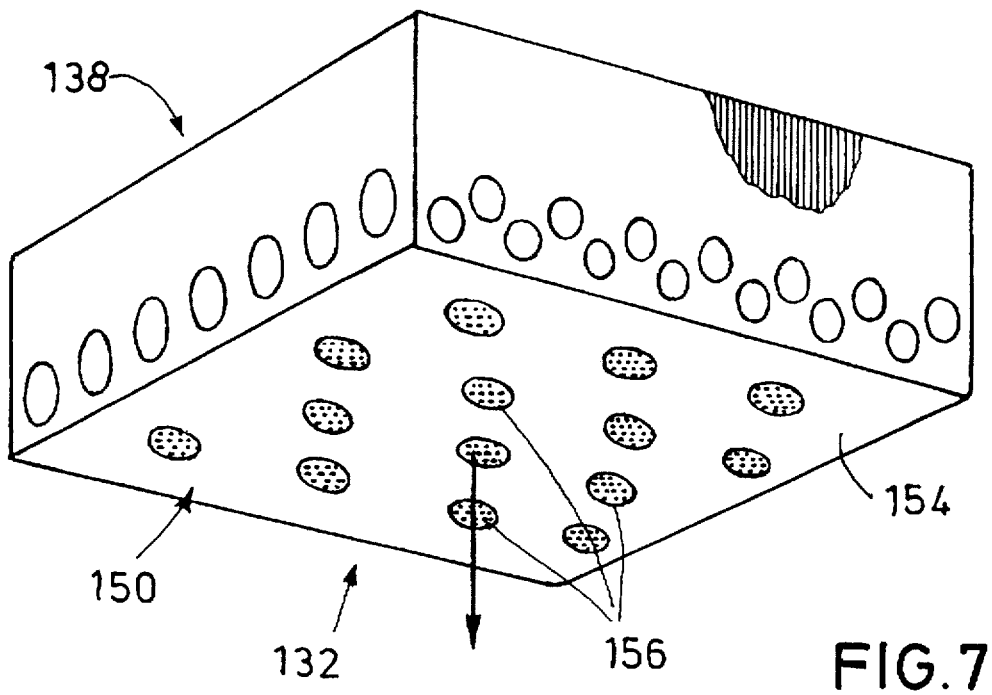
FIG. 7 is a perspective rear view of the absorber component of FIG. 5.

In the first embodiment of an absorber component 32 according to FIGS. 3 to 5, the channels 46 forming the mixing chamber 44 have a quadratic cross section. The second embodiment of an absorber component 132, illustrated in FIGS. 6 and 7, largely corresponds to the first embodiment. Parts of the absorber component 132 which correspond to parts of the absorber component 32 of the first embodiment are designated with the same reference numerals added by 100. As to the description of those parts which are identical in both embodiments, reference is made to the description of the first embodiment for avoiding redundancies.

The absorber component 132 according to the second embodiment differs from the absorber component 32 according to the first embodiment by the arrangement of mutually crossing first and second channels 160, 162. The mutually parallel first channels 160 are circular in cross section. The first channels 160 are situated in different planes and arranged in such a manner in the flow direction of absorber component 132 that they intersect all passages 142. The second channels 162, extending transversely to the first channels 160, have a distinctively larger cross section than the first channels 160. Since the second channels 162 extend transversely to the first channels 160 and have their axes arranged in a plane located between the planes of the axes of the first channels 160, all of the first channels 160 are intersected. Thus, there is formed a vault-like mixing chamber 144, with only columnar supports remaining therein. The arrangement and the function of the absorber components 132 in an absorber correspond to those of the initially described absorber components 32.

We claim:

1. An absorber, comprising:
   a plurality of absorber modules, at least one of the plurality of absorber modules comprising:
   an absorption member, the absorption member having formed therein passage means for absorption of radiation and for vacuum intake of a heat transport medium, and
   a mixing chamber in communication with the passage means, the mixing chamber comprising at least one flow-restricting outlet orifice connectable to a vacuum source,
   wherein the at least one of the plurality of absorber modules, the absorption member and the mixing chamber are all formed from a unitary ceramic body,
   wherein the passage means defines a direction, and
   wherein the mixing chamber comprises a plurality of mutually intersecting channels extending substantially transversely to the direction defined by the passage means.

2. The absorber of claim 1 wherein the passage means defines a length and a closed end, wherein the absorber module defines a first dimension and a rear side, and wherein the length of the passage means is substantially coincident with the first dimension of the absorber module and the closed end of the passage means is substantially coincident with the rear side of the absorber module.

3. The absorber of claim 2 wherein the closed end of the passage means comprises a ceramic end layer integrally formed with the ceramic body.

4. The absorber of claim 3 wherein the passage means defines at least one open end and wherein the at least one flow-restricting outlet orifice is in communication with the at least one open end of the passage means.

5. An absorber, comprising:
   a plurality of absorber modules, at least one of the plurality of absorber modules comprising:
   an absorption member, the absorption member having formed therein passage means for absorption of radiation and for vacuum intake of a heat transport medium, and
   a mixing chamber in communication with the passage means, the mixing chamber comprising at least one flow-restricting outlet orifice connectable to a vacuum source, wherein each of the plurality of absorber modules defines a plurality of outlet orifices, wherein the plurality of outlet orifices of each absorber module defines a total cross section, and wherein the total cross section defined by the plurality of outlet orifices of each absorber module is unequal to the total cross section defined by the plurality of outlet orifices of any other absorber module.

6. The absorber of claim 5 wherein the at least one of the plurality of absorber modules, the absorption member and the mixing chamber are all formed from a unitary ceramic body.

7. The absorber of claim 5 comprising a plurality of mixing chambers, the plurality of mixing chambers being in mutually spaced relationship.

8. The absorber of claim 5 comprising a ceramic fiber sealing material provided between at least two of the plurality of absorber modules.

9. The absorber of claim 5 wherein the absorber modules are not connected by a binding agent and are arranged in a vault-like configuration.

* * * * *